Patented Aug. 18, 1953

2,649,469

UNITED STATES PATENT OFFICE 2,649,469

PROCESS FOR THE PREPARATION OF ORGANIC SULFATES

Roscoe F. Neighbors, Kingsport, Tenn., assignor to Eastman Kodak Company, Rochester, N. Y., a corporation of New Jersey No Drawing. Application March 29, 1951, Serial No. 218,263

4 Claims. (Cl. 260—459)

This invention relates to the preparation of reaction products from relatively long chain alcohols reacted with sulfamic acid. More particularly this invention concerns an improved process for the preparation in relatively large yields of a high quality ammonium oleyl sulfate.

Reaction products of the class indicated derived from sulfamic acid are generally known in the art and have particular utility for certain purposes exemplified as softening agents, yarn lubricants and the like. It is important that such products exemplified by ammonium oleyl sulfate possess a good color and otherwise have high quality, as it is apparent that in the utilization of a product of poor color in the treatment of yarn or for other purposes, a low quality product might exert an injurious effect on the material treated.

In the prior art it has been proposed to prepare reaction products of long chain alcohols with certain organic acids utilizing compounds, such as amides, as catalysts. As is known, amides are generally neutral or acid substances. It has also been proposed to carry out such preparations by processes using amines such as pyridine and quinoline in the reaction for catalytic purposes and the like. Probably the most recent method of preparing compounds of the class indicated has been by carrying out the reaction of a long chain alcohol with the sulfamic acid in the presence of acidic catalysts exemplified by sulfuric acid, toluene sulfonic acid, phosphoric acid, or the like. While such prior art purposes utilizing acidic catalysts do facilitate the reaction and permit the production of recoverable yields of the product, the quality of the product produced by utilizing the prior art type of acid catalyst is not perfect, and the yields are lower when compared with the results which may be obtained by the process of the present invention.

After substantial investigation, I have found that reaction products of the class under consideration, and particularly ammonium oleyl sulfate, may be produced efficiently and in relatively high yields by the process of the present invention as set forth hereinafter in detail, utilizing a heterocyclic organic base as a catalyst and that the resultant product produced by my new process is of a better quality than similar products produced by prior art methods.

This invention has for one object to provide an improved method for the synthesis of reaction products from long chain alcohols reacted with organic acid exemplified in particular by the reaction product, ammonium oleyl sulfate. Another object is to provide a method by which organic sulfates of the class indicated may be produced which have a better color and the like improved properties. A still further object is to provide an improved process for manufacturing such organic sulfates whereby not only is a better color product obtained, but the product may be produced in relatively larger yields. A particular object is to provide an improved method whereby ammonium oleyl sulfate of relatively high quality may be produced in substantial yields. Another object is to provide a method of producing ammonium oleyl sulfate of a quality which renders it especially suitable for blending with other components for application to cellulose organic ester yarn as a treating agent for said yarns. Other objects will appear hereinafter.

I have found that improved products and improved reaction may be obtained in the reaction of a relatively long chain alcohol, exemplified by oleyl alcohol, reacted with sulfamic acid provided the reaction is carried out in the presence of a catalyst essentially comprised of a heterocyclic organic base containing another atom in the ring in addition to carbon and nitrogen. It will be observed that the catalyst which I have found to be particularly suitable, being somewhat basic in nature, is considerably different than the acidic or neutral types of catalysts which have previously been utilized in prior art processes. A typical catalyst for use in my process is morpholine and its derivatives. I have further found that even though small quantities of my heterocyclic organic base catalyst are sufficient to accelerate the reaction that in many instances the best yields and best results are obtained by the utilization of my new catalyst in the range of 5-15% of the weight of the alcohol being reacted. That is, in the reaction of oleyl with sulfamic acid in accordance with the preferred embodiment of my invention, the amount of morpholine catalyst which would be preferably used would be within the range of 5-15% of the weight of the oleyl alcohol supplied to the reaction.

It appeared desirable to mention at this point that certain other basic types of compounds exemplified by ethanolamine, propanolamine, pyridine, diethylaniline, and the like do not function as satisfactorily as my heterocyclic organic base catalyst inasmuch as such amines seem to tend to cause the reaction mass to solidify to a waxy solid before maximum yields of the desired product are obtained. On the other hand, if smaller amounts of such catalyst components are utilized, it appears that the reaction is not accelerated to the desired degree. In contrast thereto, the catalyst of the present invention, exemplified by morpholine, may be advantageously used in small amounts and amounts, as just mentioned, up to 15% function satisfactorily without causing solidification difficulties.

In general, my improved process is fundamentally relatively simple in that it merely comprises reacting together the long chain alcohol and the organic acid at a temperature in the neighborhood of 100-150° C. in the presence of my heterocyclic organic base catalyst. I have further found, however, that it is best to add the heterocyclic organic base catalyst in several portions since too large an amount of the catalyst immediately at the beginning of the reaction may tend to cause some lumping of the organic acid. Therefore, at the start of the reaction, a portion of my new catalyst is added to catalyze the initial reaction. Thereafter the remaining portion of the catalyst in increments is added as necessary in order to maintain a fluid reaction mass.

In general, my reaction may be represented by the following equation:

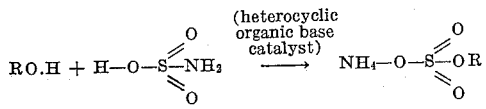

wherein R represents a radical such as oleyl.

A still further understanding of my invention will be had from the following example which is set forth to illustrate the preferred embodiment of the present invention.

I. Charge reactor with chemicals in following order:

(a) 13,400 parts by weight oleyl alcohol (about 50 moles)
(b) 340 parts by weight morpholine (start agitator)
(c) 4,850 parts by weight sulfamic acid (about 50 moles)

II. Heat at such a rate that the temperature reaches 100° C. in 1½ to 1¾ hours.

III. With the reaction temperature maintained at 100-105° C. make morpholine additions as directed below:

(a) One hour after the temperature initially reached 100° C. add 250 parts by weight of morpholine.
(b) Two hours after the temperature initially reached 100° C. add an additional 250 parts by weight of morpholine.
(c) Two and one-half hours after the temperature initially reached 100° C. add a final portion of 315 parts by weight of morpholine.

IV. Next raise the reaction temperature to 120° C. and hold at this point for two hours. At the end of this time the product is dumped.

The amount of morpholine used in the above example is about 8.62% of the weight of the oleyl alcohol used and is sufficient to maintain a fluid reaction mass until completion of the reaction.

The compound prepared by the method given has an analysis as follows:

Acid value _____ 0-0.5 mg. KOH/g. sample
Organically combined
 sulfate _____ 15.0%-18.0% as SO₃

It will be noted from the above example that as already discussed the catalyst of the present invention has been added in increments. The product produced is of exceptionally excellent color. The yield of product is several percent higher than that obtainable by using an acid catalyst or otherwise proceeding in accordance with the prior art.

In order to study the functioning of the morpholine in the aforesaid reaction, inasmuch as morpholine has been suggested in the prior art as an extractive type of solvent that may be used for purification purposes, a reaction similar to the above was carried out in the presence of an acid catalyst. This reaction in the presence of an acid catalyst produced a dark colored reaction product. This dark colored reaction product was then extractively treated with morpholine. However, the color of this product obtained by using an acid catalyst was not materially improved. Therefore, it seems apparent that the resultant lighter colored product produced by my process of the present invention utilizing a heterocyclic organic base as a catalyst is caused by this type of catalyst utilized in the reaction in the way that the product is produced without the formation of excessive color rather than because of any subsequent extractive action of the heterocyclic organic base.

The ammonium oleyl sulfate produced by the present invention not only has improved color, but its odor is satisfactory in that, for example, morpholine is relatively nontoxic and has no objectionable odor so that any small amounts thereof that may be carried into the product is not objectionable. This is important in that certain prior art methods using amines, for example, as the catalyst give products contaminated by amines which may carry sufficient odor to render such products unsuitable for applying to filaments or other materials which are to be manufactured into fabrics.

The relatively light colored odor-free improved product obtained by my process described in detail above may be considered as having the following formula:

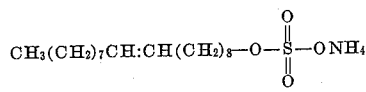

This compound may be readily blended with mineral oil, various esters, or other compounds used in textile-treating compositions. Also, the light colored relatively odor-free ammonium oleyl sulfate of the present invention may be compounded in any desired quantity with gelatin, protein sizing, or the like, for improving sizing compositions applied to yarn. I have found that the light colored, odor-free ammonium oleyl sulfate of the present invention is particularly useful for application to cellulose acetate type of yarn, in that the material is readily applied to the yarn and does not cause a darkening of the yarn or other detrimental action. For example, one yarn treating composition which might be prepared comprises mineral oil as the major component, the ammonium oleyl sulfate of the present invention from 5-20% and the balance one or more constituents such as oleic acid, ethanolamine, turpene ether, sorbitan compounds, and the like. Such yarn treating agents go into solution or emulsion very readily without precipitation therefrom even when the liquid is subjected to temperature changes and very readily may be applied to cellulose ester yarn by conventional methods to produce a yarn having improved softness.

The reaction products of the present invention may be used for purposes other than as ingredients of yarn treating compositions, for example, as detergents, surface active agents, and the like.

In accordance with my preferred embodiment I referred to R as the oleyl radical. However, in some instances the relatively long chain alcohols may have from 10 to 22 carbon atoms in the chain and is reacted in a somewhat analogous manner to the above. Other such alcohols are illustrated by lauroyl and stearyl alcohol, etc.

I claim:

1. In a process of producing ammonium oleyl sulfate of improved color and odor by the reaction of oleyl alcohol with sulfamic acid, the characterizing feature which comprises carrying out said reaction in the presence of morpholine as a catalyst.

2. In a process of producing ammonium oleyl sulfate of improved color and odor by the reaction of oleyl alcohol with sulfamic acid, the characterizing feature which comprises carrying out said reaction in the presence of 5–15%, based on the weight of the alcohol, of morpholine as a catalyst.

3. The process in accordance with claim 2 wherein only a portion of the morpholine is added at the start of the process and the remainder of the morpholine is added in increments during the carrying out of the process.

4. The process of preparing ammonium alkylene sulfate of improved color and in relatively high yields which comprises forming an initial reaction charge containing, in parts by weight, of approximately 13,400 parts of oleyl alcohol, approximately 340 parts morpholine and approximately 4850 parts of sulfamic acid, heating this reaction material at a rate that the temperature reaches approximately 100° C.–110° C. in between one to two hours, approximately one hour after the reaction materials aforesaid have reached the 100° C.–110° C. temperature incorporating about 250 more parts of morpholine to the reaction, thereafter incorporating an additional 250 parts of morpholine and still later while the reaction is still up to temperature, incorporating still a larger amount of morpholine, raising the reaction temperature to in excess of the temperature then prevailing and holding it for a period, and thereafter recovering the ammonium alkylene sulfate from the reaction mass.

ROSCOE F. NEIGHBORS.

References Cited in the file of this patent

UNITED STATES PATENTS

| Number | Name | Date |
|---|---|---|
| 2,289,760 | Dickey et al. | July 14, 1942 |
| 2,452,943 | Malkemus et al. | Nov. 2, 1948 |

FOREIGN PATENTS

| Number | Country | Date |
|---|---|---|
| 382,942 | Great Britain | Oct. 17, 1932 |